(12) United States Patent
Kurtz et al.

(10) Patent No.: US 7,432,795 B2
(45) Date of Patent: Oct. 7, 2008

(54) PRESSURE SENSOR HEADER HAVING AN INTEGRATED ISOLATION DIAPHRAGM

(75) Inventors: Anthony D. Kurtz, Ridgewood, NJ (US); Adam Kane, Morristown, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 11/702,761

(22) Filed: Feb. 6, 2007

(65) Prior Publication Data

US 2007/0159294 A1 Jul. 12, 2007

Related U.S. Application Data

(63) Continuation of application No. 10/867,029, filed on Jun. 14, 2004, which is a continuation-in-part of application No. 10/339,725, filed on Jan. 9, 2003.

(51) Int. Cl.
*H01C 10/10* (2006.01)
(52) U.S. Cl. .................. 338/36; 338/39; 73/714
(58) Field of Classification Search ............ 338/42, 338/36, 4, 39, 47, 99; 73/714–715, 721, 73/706
See application file for complete search history.

(56) References Cited

U.S. PATENT DOCUMENTS

| | | | | |
|---|---|---|---|---|
| 4,303,903 A * | 12/1981 | Matsuoka et al. | ............ | 338/4 |
| 4,379,279 A * | 4/1983 | Nasiri | ............ | 338/42 |
| 4,695,817 A | 9/1987 | Kurtz et al. | | |
| 5,831,170 A * | 11/1998 | Sokn | ............ | 73/706 |
| 6,176,137 B1 * | 1/2001 | Sasaki et al. | ............ | 73/754 |
| 6,577,224 B2 * | 6/2003 | Kurtz | ............ | 338/42 |
| 6,604,429 B1 * | 8/2003 | Pitzer | ............ | 73/756 |
| 2003/0200812 A1 * | 10/2003 | Kuhn et al. | ............ | 73/715 |

* cited by examiner

*Primary Examiner*—K. Richard Lee
(74) *Attorney, Agent, or Firm*—The Plevy Law Firm

(57) ABSTRACT

A pressure sensor header for a pressure transducer includes a header shell having a sensor cavity formed therein, a sensor element disposed in the sensor cavity, a fluid medium disposed in the sensor cavity, an isolation diaphragm closing the sensor cavity, and a joining arrangement disposed at an interface of the isolation diaphragm and the header shell, the joining arrangement joining the isolation diaphragm with the header shell. The isolation diaphragm is an integral unit comprising a thin membrane surrounded by a thicker outer ring. The joining arrangement has a recessed female joining element formed in one of the outer ring of the isolation diaphragm and the header shell, and a protruding male joining element formed on the other one of the outer ring of the isolation diaphragm and the header shell, the male joining element received in the female joining element.

8 Claims, 6 Drawing Sheets

PRESSURE SENSOR HEADER HAVING AN INTEGRATED ISOLATION DIAPHRAGM

REALTED APPLICATIONS

This application is a continuation of U.S. patent application Ser. No. 10/867,029, entitled Pressure Sensor Header Having An Integrated Isolation Diaphragm and filed on Jun. 14, 2004 which is a continuation-in-part of U.S. patent application Ser. No. 10/339,725 entitled, "Pressure SensorHeader Having An Integrated Isolation Diaphragm" and filed on Jan. 9, 2003.

FIELD OF THE INVENTION

The present invention relates to pressure transducers, and more particularly, to a pressure sensor header having an integrated isolation diaphragm which is joined with the shell or body of the header via a tongue and groove joining arrangement.

BACKGROUND OF THE INVENTION

Pressure transducers normally include pressure sensor headers. See for example, U.S. Pat. No. 4,695,817 entitled, ENVIRONMENTALLY PROTECTED PRESSURE TRANSDUCERS EMPLOYING TWO ELECTRICALLY INTERCONNECTED TRANSDUCER ARRAYS issued to A. D. Kurtz et al. on Sep. 22, 1987 and assigned to the assignee herein. Certain pressure sensor headers include a metal header shell that defines a sensor cavity. The sensor cavity houses a sensor element and contains a fluid medium, which at least covers the sensor. The sensor cavity is hermetically sealed with an isolation diaphragm that is welded to the header shell.

In normal operation, the fluid medium transmits pressure from the isolation diaphragm to the silicon sensing diaphragm of the sensor. Silicone oil is usually selected as the fluid medium because it exhibits minimum compressibility, and thus, allows accurate transmission of pressure without nonlinearities or dead-bands.

Pressure transducers may be employed in high pressure environments. For example, pressure transducers are used for monitoring pressure in power generating pumps. The pressure sensor headers of these transducers often operate under external (hydrostatic) pressures, which can reach extremes, up to and in excess of 50,000 psi. These pressures act on the front face and side wall of the header. The pressure force acting on the header shell's cylindrical side wall generates compressive tangential and radial stresses (hoop stress) in the side wall. Although pressure sensor headers can be helium leak tested and qualify as hermetic, such sensors used in the presence of hydrogen gas can leak, allowing the introduction of hydrogen into the oil-filled sensor cavity, as the hydrogen molecules are much smaller than helium molecules.

A possible entry path for the hydrogen is the isolation diaphragm weld. Conventional designs employ a laser welding process to hermetically seal the isolation diaphragm to the header shell. In this welding process, the diaphragm is positioned on the header shell and spot welded. The diaphragm is then fully laser welded to the header shell using a conventional lap or partially penetrating weld. Under excessive cyclic operation, the weld area experiences high stress, which tends to cause the propagation of very small cracks in these shallow, conventional lap or partially penetrated welds joining the isolation diaphragm with the header shell. The stress may result in weld fracture and fatigue failure, thus, presenting an entry point for the hydrogen gas molecules, which are much smaller than helium gas molecules. Thus, over time, the hydrogen gas can penetrate the very small cracks in the shallow, conventional welds.

When hydrogen gas is introduced into the oil-filled sensor cavity, the system pressure must first compress the hydrogen gas, before transmitting the pressure through the silicone oil. This gas compression presents a dead-band at low pressures, and causes a non linear effect on the sensor output.

Thus, a pressure sensor header is needed which has an integrated isolation diaphragm and diaphragm/header shell weld area that prevents entry of hydrogen gas into the sensor cavity under excessive cyclic operation in extreme external pressures.

SUMMARY OF THE INVENTION

A first aspect of the invention involves a pressure sensor header for a pressure transducer. The header comprises a header shell having a sensor cavity formed therein, a sensor element disposed in the sensor cavity, a fluid medium disposed in the sensor cavity, an isolation diaphragm closing the sensor cavity, and a joining arrangement disposed at an interface of the isolation diaphragm and the header shell, the joining arrangement joining the isolation diaphragm with the header shell. The joining arrangement comprises a recessed female joining element formed in one of the isolation diaphragm and the header shell, and a protruding male joining element formed on the other one of the isolation diaphragm and the header shell, the male joining element received in the female joining element.

A second aspect of the invention involves the isolation diaphragm which may be an integral unit comprising a thin membrane surrounded by a thicker outer ring. The recessed female joining element may be formed in one of the outer ring of the isolation diaphragm and the header shell, and the protruding male joining element may be formed on the other one of the outer ring of the isolation diaphragm and the header shell.

A further aspect of the invention involves a pressure transducer assembly comprising the pressure sensor header described above joined with a second transducer assembly member.

A further aspect of the invention involves a method of joining an isolation diaphragm with a header shell of a pressure sensor header. The method comprises the steps of providing a protruding male joining element on one of the header shell and the isolation diaphragm, providing a recessed female joining element on the other one of the header shell and the isolation diaphragm, assembling the isolation diaphragm to the header shell at a isolation diaphragm-header shell interface so that the male joining element is disposed in the female joining element, and welding the isolation diaphragm and the header shell at the interface.

BRIEF DESCRIPTION OF THE DRAWINGS

For a fuller understanding of the invention, reference is made to the following description taken in connection with the accompanying drawings, in which.

DETAILED DESCRIPTION OF THE INVENTION

Figure 1:
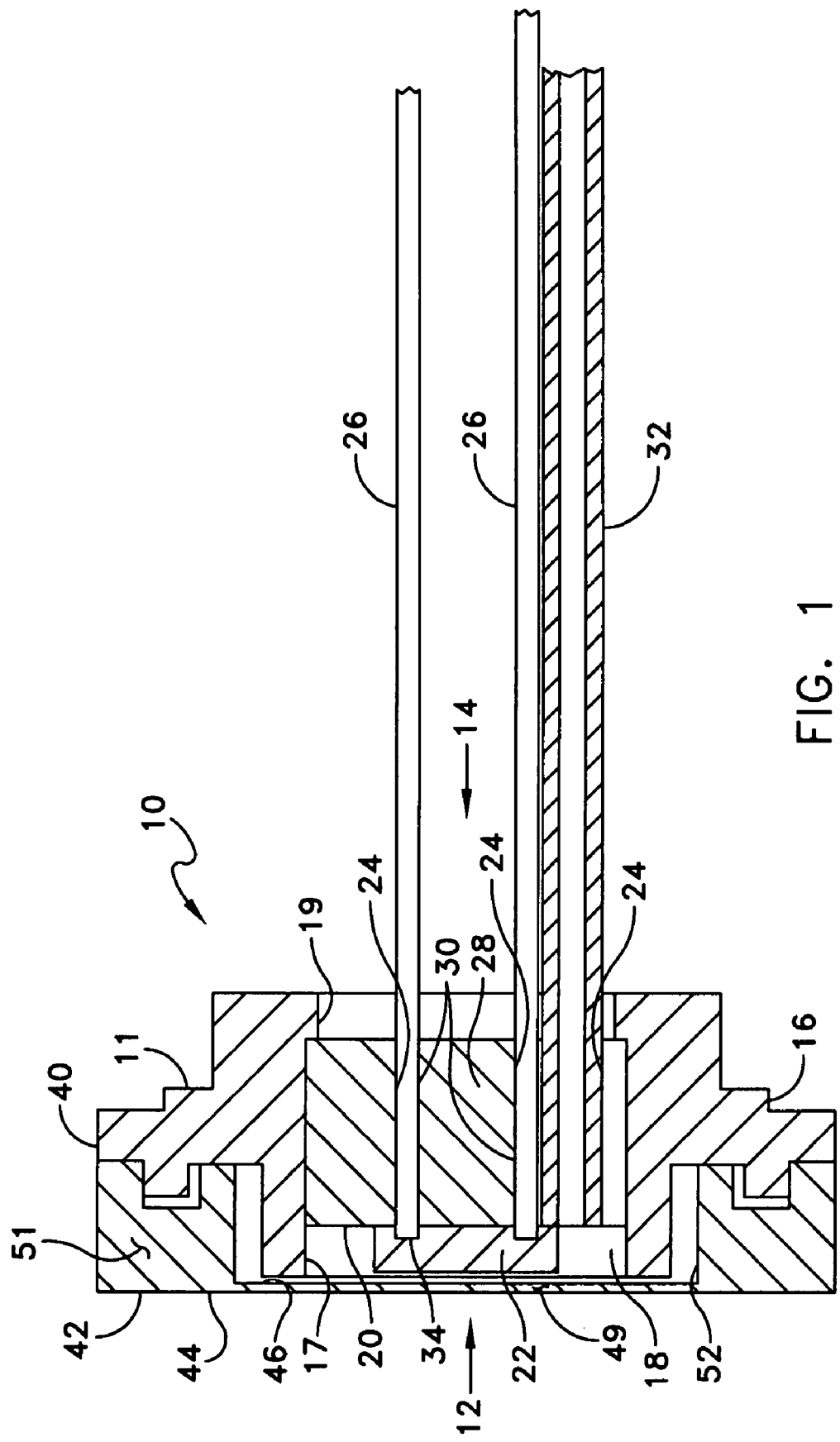
FIG. 1 is a sectional view of an illustrative pressure sensor header made according to the principles of the present invention.

FIG. 1 shows an illustrative embodiment of a pressure sensor header 10 made according to the principles of the present invention. As shown, the pressure sensor header 10 includes a body or shell 11, which is typically made from a metal or metal alloy. The shell 11 has a front end 12, an opposing back end 14, a stepped side wall 16, and a cylindrical bore 17 with an inwardly directed annular flange 19 at the back end 14. A fused, glass seal or bead 28 is disposed in the bore 17 of the shell 11, and seated on the flange 19. The shell 11 and glass bead 28 define a sensor cavity 18, which faces the front end 12 of the shell 11. The sensor cavity 18 contains a sensor element 22, which may be centrally mounted on the glass bead 28, the top surface of which forms a floor 20 of the sensor cavity 18. A plurality of cylindrical apertures 24 extend through the glass bead 28 and communicate with the sensor cavity 18. A number of the apertures 24 contain a pin 26. The pins 26 are typically constructed of a gold-plated, glass sealing alloy, such as Kovar. The fused glass bead 28 forms a glass-metal seal 30 with each pin 26. The glass-metal seals 30 hermetically seal the pins 26 to the shell 11, thus preventing pressure medium (not shown) leakage from the front end 12 of the shell 11 to the back end 14 of the shell 11. The fused, glass bead 28 also dielectrically insulates the pins 26 from the shell 11. A tube 32 is also disposed in one of the apertures 24. The tube 32 allows the sensor cavity 18 to be filled with a suitable fluid medium, such as silicone oil, after which the tube 32 may be sealed by welding or other conventional sealing means.

Leaded or leadless sensor methods can be used for electrically coupling the sensor element 22 to the header pins 26. In the shown embodiment, a leadless sensor method in the form of gold frit layers 34 is used for electrically coupling the sensor element 22 to the header pins 26. Embodiments which utilize leaded sensor methods may use gold bond wires (not shown) to electrically couple the sensor element 22 to the pins 26.

In a further embodiment of the present invention (not shown), the glass bead 28 of FIG. 1, may be replaced by a metal floor which may be unitary with the shell. The pin and tube apertures may extend through the metal floor. Glass beads may be used around the pins to seal them to the metal floor and dielectrically isolate them from the shell.

The shell 11, adjacent the front end 12 thereof, includes a rim-like annular flange surface 40 which mounts an isolation diaphragm 42 having opposing outer and inner sides 44, 46. The isolation diaphragm 42 hermetically seals the sensor cavity 18 and also forms a front face of the pressure sensor header 10. The isolation diaphragm 42 includes a thin membrane 49 surrounded by and unitary or integral with a comparatively thicker outer ring 51. Typically the thickness of the diaphragm is between 0.002 and 0.005 inches. The thickness and diameter are selected according to the desired application, pressure range, and sensitivity. The added thickness of the outer ring 51 (relative to the membrane 49) is provided on the inner side 46 of the isolation diaphragm 42. The added thickness is provided on the inner side of the diaphragm, to increase the distance of the thin diaphragm member from the heat affected zone of the weld area in the thick region. Increasing the distance from the weld area prevents thermal stresses from buckling or damaging the thin diaphragm member. Placing the added thickness on the outer side of the diaphragm would place the thin diaphragm in line with the heat affected zone, allowing the diaphragm to be damaged during the welding process. The isolation diaphragm 42 of the present invention provides very high sensitivity and accuracy for the pressure range of the transducer to be designed. The integral membrane/ring construction of the isolation diaphragm 42 eliminates weld stresses and heat affected zones in the highly stressed outer periphery 52 of the thin membrane 49.

Figure 2:
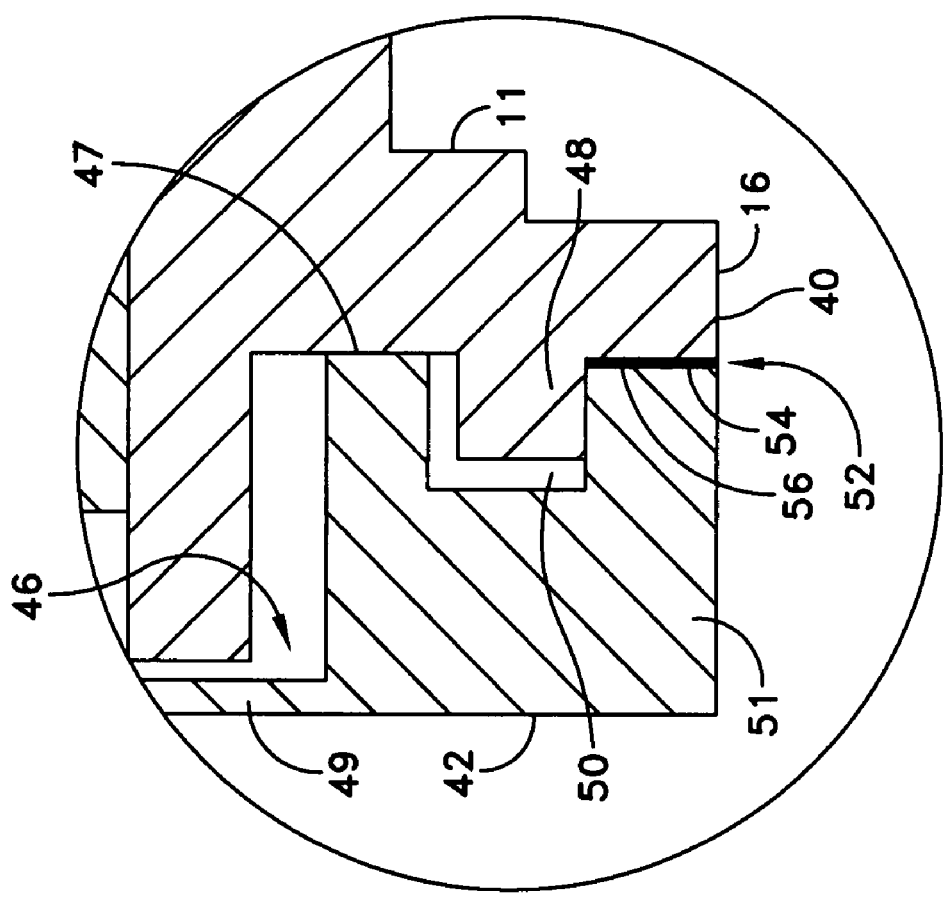
FIG. 2 is an enlarged view of the area circled of FIG. 1.

In accordance with the present invention, the isolation diaphragm 42 is joined to the annular flange surface 40 of the shell 11 by a tongue and groove joining structure or arrangement. As best shown in FIG. 2, the tongue and groove joining arrangement includes a ring-shaped tongue or protruding male element 48 formed on the annular flange surface 40 of the header shell 11. The tongue 48 is typically positioned concentrically with the side wall 16 of the shell 11. As per the shown embodiment, a mating or matching ring-shaped groove or recessed female element 50 is formed in the inner surface 47 of the isolation diaphragm outer ring 51. Alternatively, the tongue and groove joining arrangement may include a tongue (not shown) formed on the inner surface 47 of the isolation diaphragm outer ring 51 and a corresponding groove (not shown) formed in the annular flange surface 40 of the header shell 11. The tongue 48 is formed to fit tightly (conventional slip-fit or press-fit) within the groove 50, upon assembly of the isolation diaphragm 42 with the shell 11, to create a weld area 54 at the diaphragm-header shell interface 52 suitable for electron-beam welding or other known welding methods.

Figure 3:
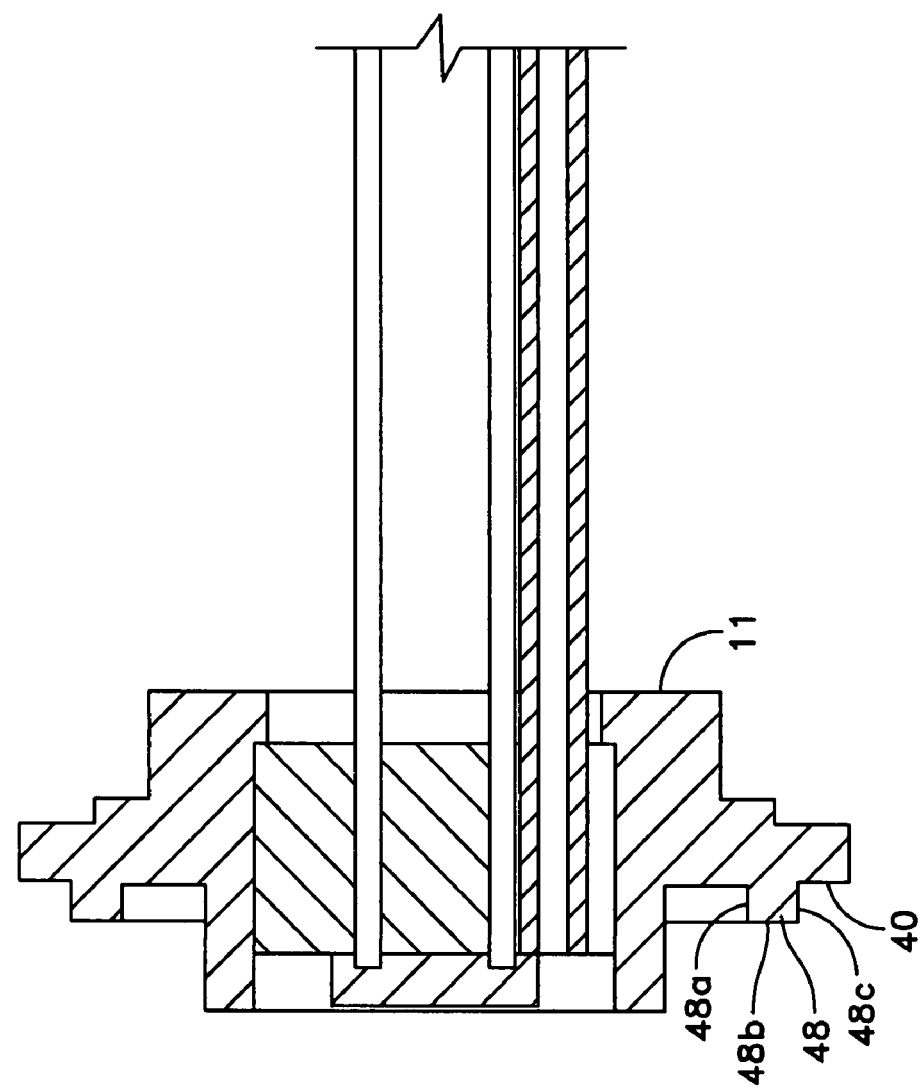
FIG. 3 is an exploded, sectional view of a portion of the header in FIG. 1.
Figure 3:
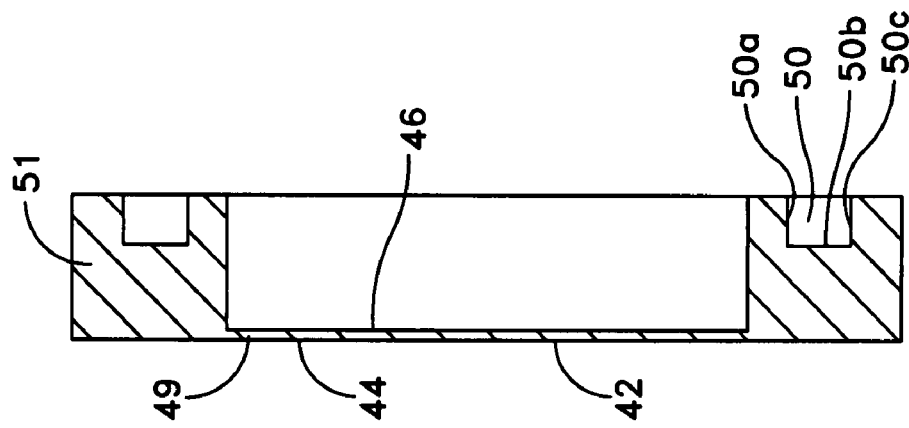

Referring to FIG. 3, the tongue 48 is typically configured to have a rectangular-shaped cross-section, such that the tongue 48 protrudes perpendicularly from the annular flange surface 40 of the header shell 11 and has three groove mating surfaces 48a, 48b, 48c, which are substantially orthogonal relative to each other. The matching groove 50 would also be configured in a rectangular-shaped cross-section with three tongue mating surfaces 50a, 50b, 50c. The tongue and matching groove may also be configured in cross-sectional shapes other than rectangular, such as semicircular or triangular.

The tongue and groove joining arrangement may also include two or more grooves or combination of groove(s) and tongue(s) formed in and/or on one of the annular flange surface 40 of the header shell 11 or inner surface 46 of the isolation diaphragm 42 and a matching number of tongues or combination of tongues and grooves formed in and/or on the other one of the annular flange surface 40 of the header shell 11 or inner surface 46 of the isolation diaphragm 42. The tongue and groove joining arrangement may also be implemented with other male-female type joining configurations.

Referring again to FIG. 2, the tongue and groove joining arrangement of the present invention permits a full penetration weld 56 (to the tongue 48) to be made in weld area 54. Weld 56 extends through the diaphragm-header shell interface 52 to the respective mating surfaces 48c, 50c of the tongue 48 and groove 50. Hence, the tongue and groove joining arrangement increases the weld depth, as compared with conventional butt welds or partial welds, thereby increasing the joint strength without the need for increasing the actual wall thickness of the header shell 11.

Figure 4:
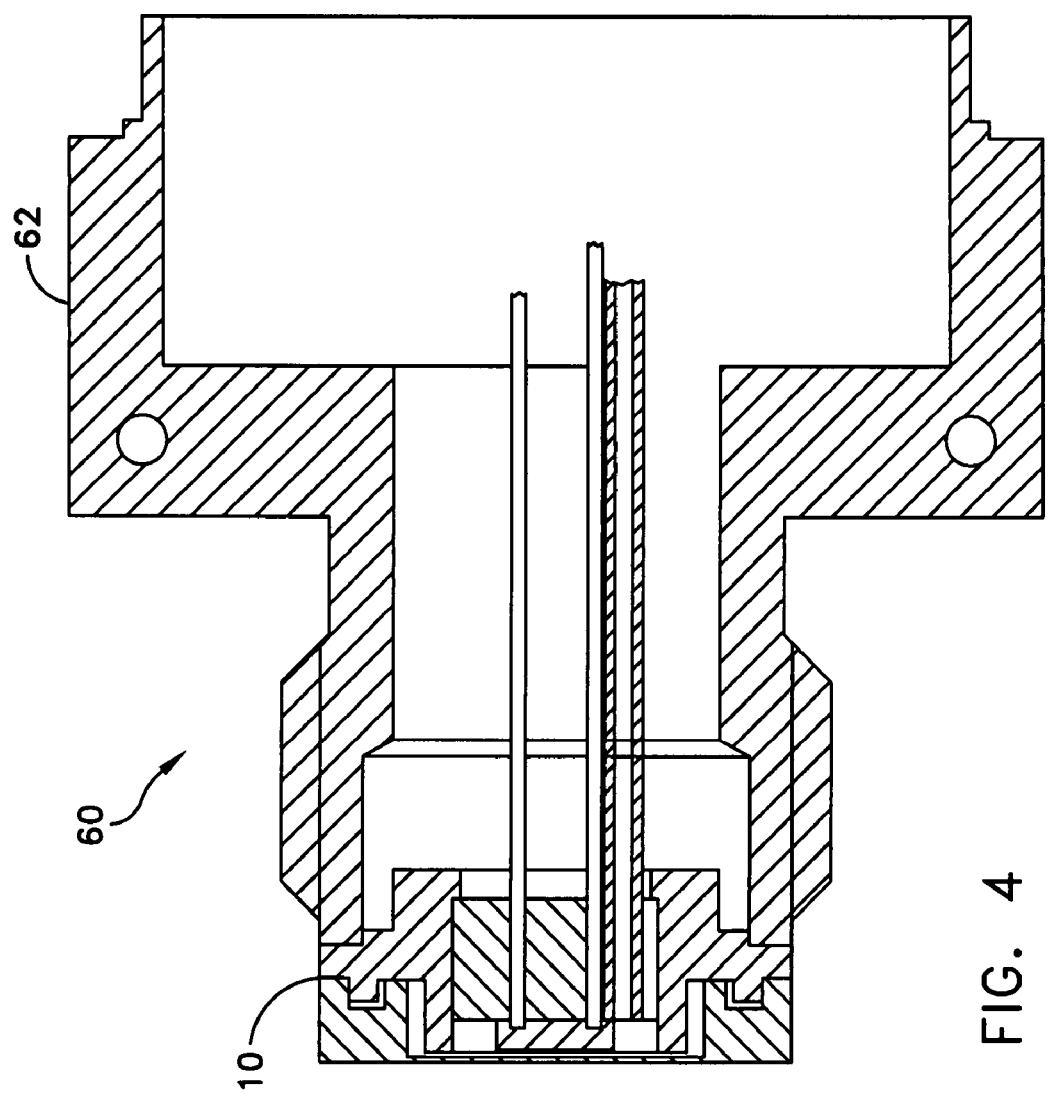
FIG. 4 is a sectional view of a pressure transducer assembly that utilizes a pressure sensor header made according to the principles of the invention.

The pressure sensor header 10 of the present invention may be utilized in a pressure transducer assembly, such as the one shown in FIG. 4. In the shown pressure transducer assembly, denoted by numeral 60, the pressure sensor header 10 is joined with a port 62. In other transducer assemblies, the pressure sensor header 10 may be joined with other transducer assembly members, such as the sensor body.

Figure 5:
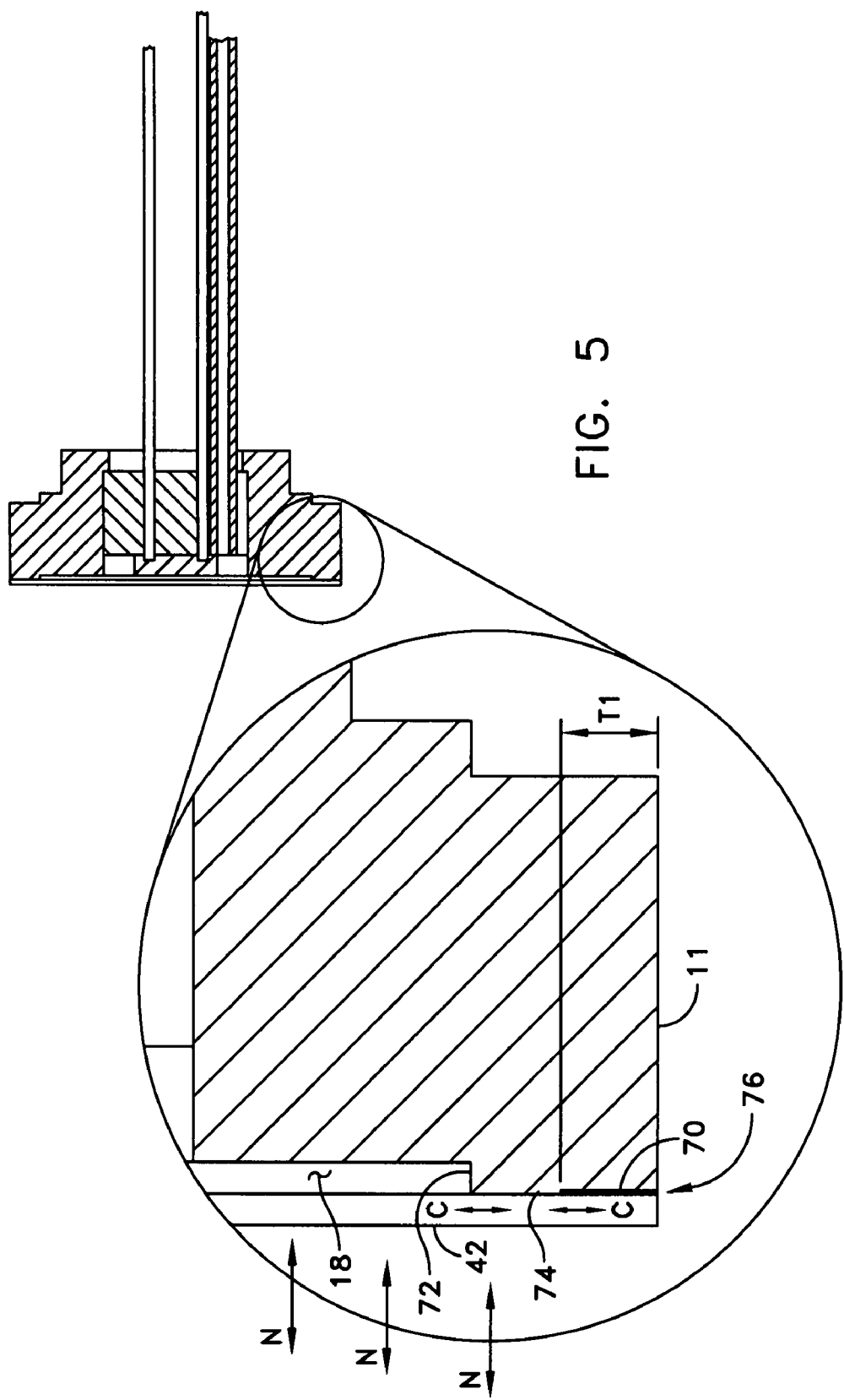
FIG. 5 is a sectional view of a portion of a conventional pressure transducer assembly showing how stress causes crack propagation at the diaphragm-header shell interface.

As mentioned earlier, high bending stresses tend to cause crack propagation in conventional lap or partially penetrated welds joining the isolation diaphragm 42 with the header shell 11, which eventually results in weld fracture and subsequent hydrogen infiltration into the sensor cavity 18. The tongue and groove arrangement of the invention substantially eliminates such problems because, unlike conventional joining methods such as lap welds or partial penetration welds, the tongue and groove arrangement of the invention aids in preventing crack propagation under static or cyclic loading conditions. In the case of a conventional partial depth lap weld joining arrangement, as shown in FIG. 5 and denoted by numeral 70, cracks 74 (only one shown) in the weld 70 frequently occur along the inner circumference 72 of the diaphragm-header shell interface 76. The applied cyclic external (hydrostatic) pressure N generates bending stress forces C, which operate to open the cracks 74. Under cyclic pressure conditions, this repeated force will continue to open the crack 74, with each cycle, thus, allowing hydrogen gas to eventually penetrate into the sensor cavity.

Figure 6:
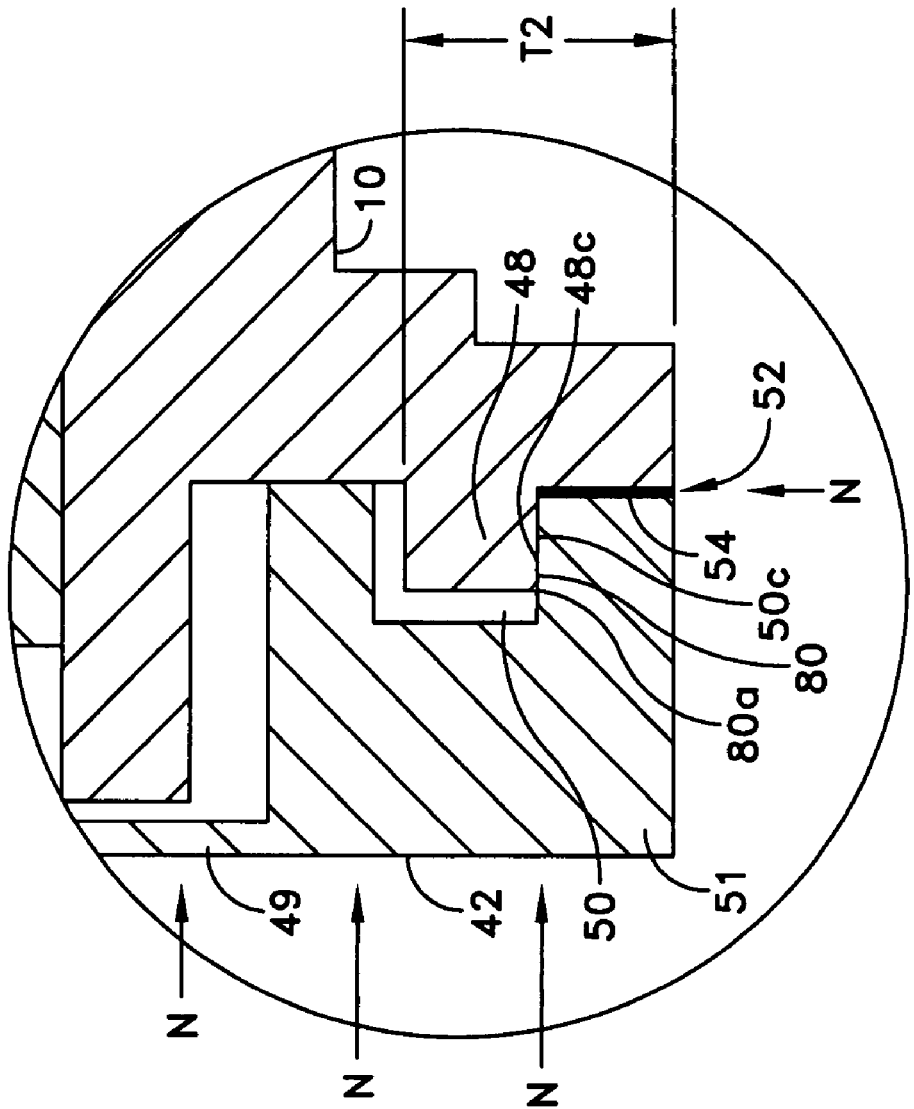
FIG. 6 is a sectional view of a pressure sensor header utilizing the tongue and groove isolation diaphragm to header shell joining arrangement of the present invention, showing how the joining arrangement takes advantage of hoop stress to stop crack propagation at the diaphragm-header shell interface.

However, as shown in FIG. 6, the tongue and groove joining arrangement of the present invention turns the direction of the cracks 80 (only one shown) 90 degrees so that the leading ends or crack tips 80a of the cracks 80 will be along the outer cylindrical surfaces 48c, 50 c of the tongue and groove joining arrangement. The weld and bending stress are removed from the thin active membrane 49 of the isolation diaphragm 42. The weld stress and heat affected zone of the weld area are removed from the interface where the integral diaphragm meets the thicker outer ring. All the weld stresses are at the tongue and groove arrangement, away from the integral diaphragm. The stress resulting from the external pressure N is a hoop stress, in compression, which closes the leading ends 80a of the crack 80, preventing crack propagation. This application of compression rather than tension stress on the crack has an effect similar to that of drilling a hole at the tip of a crack, to reduce the stress concentration on the crack tip (the crack tip is where the stress is highest, and is the initiating point for opening the crack). Thus, this tongue and groove joining arrangement of the present invention improves on fatigue survival rates under cyclic pressure conditions, by moving the weld away from the thin member and preventing crack propagation in the weld joint area. Furthermore, the increased weld thickness, (T2 in the present invention of FIG. 6 versus T1 in the prior art of FIG. 5) allowed by the tongue and groove joining arrangement, also provides a longer path to prevent the penetration of hydrogen gas. The weld depth achieved with the tongue 48 acting as a heat block provides a thicker weld compared to butt welds. The longer weld depth prevents hydrogen permeability into the sensor, eliminating non-linearities in measurement, and potentially explosive situations.

As mentioned above, the tongue serves as a stop, thereby preventing the laser or electron beam or other welding medium from penetrating further into the joint. As can be seen in FIG. 5, the laser, electron beam or other welding medium may penetrate through the depth of the conventional partial depth butt weld 70, to the sensor cavity, thereby damaging the sensor or the wires. However, as can be seen in FIG. 6, the tongue 48 blocks or shields the laser, electron beam or other welding medium and thereby preventing the same from penetrating to the sensor cavity of the header 10.

The foregoing description of the embodiments of this invention has been presented for purposes of illustration and description. It is not intended to be exhaustive or to limit the embodiments of the invention to the form disclosed, and, obviously, many modifications and variations are possible. Such modifications and variations that may be apparent to a person skilled in the art are intended to be included within the scope of this invention as defined by the accompanying claims.

What is claimed is:

1. A method of joining an isolation diaphragm with a header shell of a pressure sensor header, comprising the steps of:

providing a protruding male joining element on one of the header shell and the isolation diaphragm;

providing a recessed female joining element on the other of the header shell and the isolation diaphragm, said female joining element having a shape oppositely matching a shape of said male joining element;

assembling the isolation diaphragm to the header shell at a isolation diaphragm header shell interface so that the male joining element is disposed in the female joining element; and welding the isolation diaphragm and the header shell at the interface, wherein a welding area extends along said interface to said joined male and female joining elements.

2. The method of claim 1 wherein the welding is performed with electron beam welding.

3. The method of claim 1, wherein the male joining element is provided on the isolation diaphragm and the female joining element is provided in the header shell.

4. The method of claim 1, wherein the male joining element is provided on the header shell and the female joining element is provided in the isolation diaphragm.

5. The method of claim 1, wherein the male and female joining elements have mating rectangular cross-sections.

6. The method of claim 1, wherein the isolation diaphragm is an integral unit comprising a thin member surrounded by a thicker outer ring.

7. The method of claim 6, wherein the male joining element is provided on the outer ring of the isolation diaphragm and the female element is provided on the header shell.

8. The method of claim 6, wherein the male joining element is provided on the header shell and the female joining element is provided in the outer ring of the isolation diaphragm.

* * * * *